United States Patent [19]

Uesaka et al.

[11] Patent Number: 4,943,862

[45] Date of Patent: Jul. 24, 1990

[54] CATHODE-RAY TUBE WITH MULTI-LAYER RESIN COATING ON FACEPLATE PROVIDING IMPLOSION PROTECTION

[75] Inventors: Kazuo Uesaka; Akira Yamada; Kazuyoshi Teramoto; Ituo Nishiyama; Kousuke Haraga, all of Amagasaki, Japan

[73] Assignee: Mitsubishi Denki Kabushiki Kaisha, Tokyo, Japan

[21] Appl. No.: 155,597

[22] Filed: Feb. 12, 1988

[30] Foreign Application Priority Data

Feb. 12, 1987 [JP] Japan .................................. 62-30026

[51] Int. Cl.$^5$ ......................... H01J 29/87; H04N 5/64

[52] U.S. Cl. ................................ 358/245; 313/477 R; 313/479

[58] Field of Search ............... 358/245, 246, 247, 248, 358/249, 250, 251, 252, 253, 254, 255; 313/461, 466, 473, 476, 477 R, 479, 482

[56] References Cited

U.S. PATENT DOCUMENTS

| | | | |
|---|---|---|---|
| 4,204,231 | 5/1980 | Permenter | 313/477 R |
| 4,332,329 | 6/1982 | Scriven et al. | 358/245 |
| 4,709,272 | 11/1987 | Tischer | 358/247 |
| 4,739,412 | 4/1988 | Lee | 358/247 |

FOREIGN PATENT DOCUMENTS

| | | | |
|---|---|---|---|
| 59-76065 | 5/1084 | Japan . | |
| 51-18311 | 6/1976 | Japan . | |
| 53-64460 | 6/1978 | Japan | 358/245 |
| 54-128265 | 10/1979 | Japan . | |
| 59-71559 | 5/1984 | Japan . | |
| 59-71560 | 5/1984 | Japan . | |
| 59-81844 | 5/1984 | Japan | 313/479 |
| 60-47352 | 3/1985 | Japan . | |
| 61-124039 | 6/1986 | Japan . | |

*Primary Examiner*—James J. Groody
*Assistant Examiner*—Randall S. Svihla
*Attorney, Agent, or Firm*—Birch, Stewart, Kolasch & Birch

[57] ABSTRACT

An implosion protected cathode ray tube which comprises a glass envelope having a faceplate; and a layered protective structure deposited over and positioned frontwardly of the faceplate. The layered protective structure includes a first resin-coated layer held in contact with the faceplate, a hard coated layer for protecting the first resin-coated layer and a second resin-coated layer formed between the first resin-coated layer and the hard coated layer. The first resin-coated layer has a hardness which corresponds to 1H or lower of hardness of drafting pencil lead, and an elongation at breakage within the range of 65 to 85%. The first resin-coated layer also has a break strength of 3.5 kilograms per square millimeter or greater. The hard coated layer has a hardness which corresponds to 5H or higher of hardness of drafting pencil lead, and an elongation of 3% or smaller at breakage. The second resin-coated layer has a hardness generally intermediate between the hardness of the first resin-coated layer and that of the hard coated layer and also an elongation at breakage generally intermediate between the elongation of the first resin-coated layer at breakage and that of the hard coated layer at breakage.

12 Claims, 1 Drawing Sheet

PRIOR ART

CATHODE-RAY TUBE WITH MULTI-LAYER RESIN COATING ON FACEPLATE PROVIDING IMPLOSION PROTECTION

BACKGROUND OF THE INVENTION

1. Field of the Invention

The present invention generally relates to cathode ray tubes and, more particularly, to implosion protected cathode ray tubes.

2. Description of the Prior Art

A cathode ray tube comprises a glass envelope having an electron gun and a phosphor screen positioned inside and at opposite ends of the glass envelope. In the case of the cathode ray tube used in a television receiver set, the glass envelope is typically of a shape having a generally cylindrical neck portion closed at one end thereof by a stem and accommodating therein the electron gun, a generally funnel-shaped portion flared outwardly from the other end of the neck portion with its opening closed by a faceplate on the inside of which the phosphor screen is deposited.

As a matter of design, the glass envelope, also known as the vacuum enclosure, is highly evacuated to a substantial vacuum and is susceptible to implosion when exposed to severe conditions, for example, abrupt change in temperature or violent handling. The implosion is known as a phenomenon in which the glass envelope collapses inwardly in the presence of a great difference in pressure inside and outside the glass envelope.

The implosion of the glass envelope of the cathode ray tube is accompanied by outward scattering of fragments of glass used to form the glass envelope. The scattering of glass fragments outwardly of the television receiver set is hazardous to television viewers who will be eventually injured when seated close to the television reciever set.

To minimize the hazardous conditions, numerous attempts have hitherto been suggested to provide an implosion protected cathode ray tube, that is, a cathode ray tube designed to have a minimized possibility of outward scattering of glass fragments even when imploded, such as disclosed in, for example, the Japanese Examined Patent Publication (Koho) No. 51-18311 published in 1976; the Japanese Laid-open Patent Publications (Kokais) No. 54-128265 published Oct. 4, 1979, and corresponding to U.S. patent application Ser. No. 890,612 filed Mar. 20, 1978, now U.S. Pat. No. 4,204,231 ; No. 60-47352 published in 1985; and No. 61-124039 published June 11, 1986, and the Japanese Laid-open Utility Model Publications No. 59-71559 published in 1984; No. 59-71560 published in 1984; and No. 59-76065. All of the prior art publications except for the Japanese Examined Patent Publication No. 51-18311 disclose the use of a protective panel fitted to the faceplate of the cathode ray tube in a respective method.

Of these prior art publications, the Japanese Examined Patent Publication No. 51-18311 discloses the use of a reinforcement band of steel encompassed exteriorly around the perimeter of the faceplate of the cathode ray tube. The technique disclosed in this prior art publication is merely to physically reinforce the cathode ray tube, rather than to provide an implosion protected cathode ray tube, and therefore, the cathode ray tube according to this prior art publication still has a problem in that, once the cathode ray tube is imploded, fragments of glass may scatter outwardly of the television receiver set.

The reinforcement of the cathode ray tube by the use of the steel reinforcement band may be satisfactory where the cathode ray tube is of a small size. However, when it comes to the cathode ray tube of about 30 inches or more in screen size, the pressure difference inside and outside the glass envelope is very high and, for example, it is generally recognized that the cathode ray tube of 37 inch screen size is loaded 13 tons due to the high pressure difference. Therefore, the mere use of the steel reinforcement steel band is not an effective measure to the large size cathode ray tube.

The Japanese Laid-open Patent Publication 54-128265 discloses a cathode ray tube wherein a protective panel made of glass material is secured to the faceplate of the glass envelope and spaced therefrom a predetermined distance, for example, 1.6 to 6.4 mm. The space represented by the predetermined distance between the faceplate and the protective panel is filled with thermosetting resin such as polyester resin, polyurethane resin or epoxy resin which, when cured, serves as a bonding agent. To define the space between the faceplate and the protective panel and also to temporarily secure the protective panel to the faceplate during the filling of the thermsetting resin in fluid state into the space between the faceplate and the protective panel, a double sided adhesive tape of generally rectangualr frame structure complemental in shape to the shape of either the faceplate or the protective panel is interposed between the faceplate and the protective panel.

FIG. 4 of the accompanying drawings illustrates another well known version of the cathode ray tube. The glass envelope is identified by 1 and has the faceplate 2 to which a protective panel 7 made of glass material is secured through the intervention of a deposit of bonding material 8, for example, polyurethane resin. The faceplate 2 makes use of a reinforcement band of steel encompassed exteriorly therearound.

While all of the methods disclosed in the prior art publications except for the first-mentioned publication and including the method disclosed in FIG. 4 of the accompanying drawings are generally satisfactory in that the fragments of glass forming the glass envelope will not scatter outwardly of the television receiver set even when the cathode ray tube implodes. However, the use of the protective panel frontwardly of the faceplate has some problems which will now be discussed.

The protective glass panel generally used has a thickness within the range of 3 to 5 mm and therefore has a substantial weight which in turn results in increase of the overall weight of the cathode ray tube. In addition, it is not easy to manufacture the protective glass panel having a surface curvature complemental to that of the faceplate and if not impossible, the protective glass panel requires a high manufacturing cost which eventually results in increase of the manufacturing cost of the cathode ray tube.

Where the protective glass panel having a surface curvature less complemental to that of the faceplate is used and secured to the faceplate with the use of the deposit of bonding material, not only is a substantial amount of bonding material required to secure the protective panel to the faceplate of the cathode ray tube, but also the bond deposit would have a varying thickness between the faceplate and the protective glass panel such that lens-like portions would be formed somewhere in the screen of the cathode ray tube enough to distort corresponding portions of the image being reproduced on the screen.

Moreover, since the protective glass panel is rigid and is not deformable, the protective glass panel which has once been bonded to the faceplate in the wrong way and which therefore requires a re-mounting can hardly be removed from the faceplate in readiness for the remounting.

These problems might have been satisfactorily removed according to the Japanese Laid-open Patent Publication No. 61-124039. This prior art publication discloses a cathode ray tube wherein a portion of the glass envelope except for the neck portion is encompassed by a protective covering of heat-shrinkable sheet material together with the reinforcement band encircling exteriorly of the faceplate. However, even the technique disclosed in this prior art publication has a problem in that there is a possibility that, upon the heat shrinkage of the protective sheet, the resultant protective covering may have wrinkles and/or blisters formed therein. Therefore, the use of the heat-shrinkable sheet for the formation of the protective covering appears not to have a favorable productivity.

SUMMARY OF THE INVENTION

Therefore, the present invention has been devised with a view to substantially eliminating the above described problems and disadvantages inherent in the prior art cathode ray tubes and has for its essential object to provide an improved cathode ray tube of implosion protected type which is relatively light-weight and substantially free from the possibility of the televised image being distorted.

Another important object of the present invention is to provide an improved cathode ray tube of the type referred to above, which is easy to manufacture and can be manufactured at a relatively high productivity without substantially increasing the manufacturing cost of the cathode ray tube.

To this end, the present invention provides an implosion protected cathode ray tube which comprises a glass envelope having a faceplate. The faceplate of the glass envelope is exteriorly applied with a first resin-coated layer, a hard coated layer for protecting the first resin-coated layer and a second resin-coated layer formed between the first resin-coated layer and the hard coated layer. All of the first resin-coated layer, the hard coated layer and the second resin-coated layer are transparent or substantially transparent by nature or when cured, or alternatively, one or all of the first resin-coated layer, the second resin-coated layer and the hard coated layer may be colored if desired for the purpose of adjusting the light transmissivity of the faceplate of the cathode ray tube.

In accordance with the present invention, the first resin-coated layer has a hardness corresponding to 1H or lower of hardness of a drafting pencil lead and an elongation at breakage within the range of 65 to 85%. This first resin-coated layer also has a break strength of 3.5 kilograms per square millimeter or greater.

The hard coated layer has a hardness corresponding to at 5H or higher of hardness of the drafting pencil lead and an elongation of 3% or smaller at breakage. The second resin-coated layer has a hardness generally intermediate between the hardness of the first resin-coated layer and that of the hard coated layer and also an elongation at breakage generally intermediate between the elongation of the first resin-coated layer at breakage and that of the hard coated layer at breakage.

Specifically, a measure of how much a drafting pencil lead resists abrasion by the fibers of the paper being marked on represents the degree of hardness of the drafting pencil lead which is expressed by HB, F, H and 2H to 10H. Hence, the hardness of each of the first resin-coated layer, the hard coated layer and the second resin-coated layer hereinabove and hereinafter referred to for the purpose of the present invention is expressed in terms of the hardness of the drafting pencil lead. By way of example, when reference is made to the first resin-coated layer having a hardness corresponding to 1H of hardness of the drafting pencil lead, it should be understood as meaning that the first resin-coated layer has a hardness enough to resist abrasion by the drafting pencil lead of 1H hardness with no mark left on the first resin-coated layer. Similarly, the hard coated layer having a hardness corresponding to 5H of the drafting pencil lead is enough to resist abrasion by the drafting pencil lead of 5H hardness with no mark left on the hard coated layer.

Preferably, the first resin-coated layer is made of polyurethane acrylate of a type containing a relatively great quantity of urethane resin. Also, preferably, the second resin-coated layer can exhibit an elongation at breakage within the range of 0.5 to 15% and is made of polyurethane acrylate of a type containing a relatively large quantity of acrylic resin. The hard coated layer can be made of, for example, acrylic resin of ultraviolet-curable type.

Preferably, the first and second resin-coated layers have respective thicknesses within the range of 20 to 200 micrometers and within the range of 20 to 70 micrometers.

Yet preferably, at least one of the first and second resin-coated layer is made of an ultraviolet-curable synthetic resin, that is, the synthetic resin of a kind which can be cured when exposed to ultraviolet rays of light.

According to the present invention, instead of the use of the protective glass panel such as in the prior art cathode ray tubes, the layered structure of the resin coatings is employed which is light in weight. This layered structure, that is, each of the first resin-coated layer, the hard coated layer and the second resin-coated layer, can be formed by the use of a spraying technique or any other suitable painting technique and can, therefore, have a uniform thickness over the entire surface thereof which is essential to ensure a high-quality image reproduction without any distortion.

Also, since the faceplate of the glass envelope of the cathode ray tube is completely covered by the layered structure of synthetic resin, the faceplate can be advantageously reinforced and, if an external violent impact which would be strong enough to break the protective glass panel or the faceplate itself is applied to the faceplate of the cathode ray tube embodying the present invention, resultant fragments of glass used to form the faceplate may not scatter outwards and may be retained by the layered structure due to a high bonding ability exhibited by the layered structure.

In any event, since the first resin-coated layer has a relatively high break strength and also a high elongation at breakage, it has a minimized possibility of being broken or burst upon the application of an external impact, making it possible to avoid abrupt ingress of the atmospheric pressure into the glass envelope which would result in the implosion of the cathode ray tube.

This in turn brings about such an advantage that the possibility of the cathode ray tube being imploded can be minimized.

It is, however, pointed out that, when the hard coated layer is formed over and in contact with the first resin-coated layer having the high elongation at breakage, the resultant hard coated layer may have crackings formed therein as a result of change in temperature. For this reason and in order to substantially eliminate the formation of crackings in the hard coated layer, the present invention makes use of the second resin-coated layer having a less elongation at breakage and an appropriate hardness. The provision of the second resin-coated layer according to the present invention can render it to withstand change in temperature ranging from −10° C. to 150° C.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

DETAILED DESCRIPTION OF THE EMBODIMENT

Figure 1:
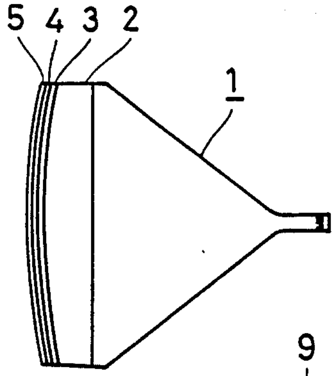
FIG. 1 is a schematic side view of an implosion protected cathode ray tube embodying the present invention.

Before the description of the present invention proceeds, it should be noted that like parts are designated by like reference numerals throughout the several views of the accompanying drawings.

Figure 4:
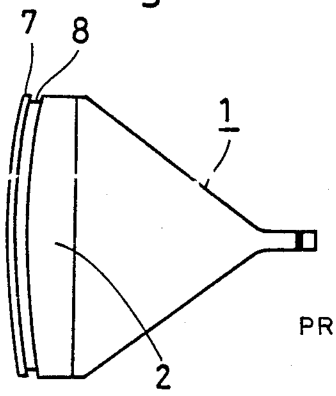
FIG. 4 is a view similar to FIG. 1 showing the prior art implosion protected cathode ray tube.

Referring to FIG. 1, the cathode ray tube of, for example, 37 inches in screen size comprises the highly evacuated glass envelope 1 having the faceplate 2 as hereinbefore described in connection with the prior art cathode ray tube shown in FIG. 4. In accordance with the present invention, the faceplate 2 has a layered protective structure deposited over the entire surface thereof. This layered protective structure includes a first resin-coated layer 3 held in tight contact with the surface of the faceplate 2, a second resin-coated layer 4 deposited on the first resin-coated layer 3 so as to overlay the first resin-coated layer 3, and a hard coated layer 5 deposited on the second resin-coated layer 4 so as to overlay the second resin-coated layer 4.

The first resin-coated layer 3 is capable of exhibiting an elongation of 65 to 85% at breakage and has a break strength of a value equal to or greater than 3.5 kilograms per square millimeter and also a hardness of a value equal to or lower (softer) than the 1H hardness of a drafting pencil lead. The hard coated layer 5 is capable of exhibiting an elongation at breakage of a value equal to or smaller than 3% and has a hardness of a value equal to or higher (harder) than the 5H hardness of the drafting pencil lead. The second resin-coated layer 4 has an elongation at breakage which is generally intermediate between that of the first resin-coated layer 3 and that of the hard coated layer 5, and also a hardness which is also generally intermediate between that of the first resin-coated layer 3 and that of the hard coated layer 5.

The first resin-coated layer 3 is made of polyurethane acrylate containing a relatively large quantity of urethane resin, such as the one sold under a trade identification of "GRANDIC.FC-0612" manufactured by Dainippon Ink Kogyo K. K. of Japan, and has a thickness of about 100 micrometers.

The second resin-coated layer 4 is made of polyurethane acrylate containing a relatively large quantity of acrylic resin, such as the one sold under a trade identification of "GRANDIC.FC-0608" manufactured by Dainippon Ink Kogyo K. K. of Japan, and has a thickness of about 30 micrometers.

It is to be noted that, other than polyurethane acrylate, any one of acrylic resin, urethane resin and silicone resin may be employed as a coating material for both of the first and second resin-coated layers 3 and 4. However, the use of the polyurethane acrylate for both of the first and second resin-coated layers 3 and 4 is recommended because it has excellent properties in respect of the physical characteristic, the smoothness, the light transmissivity, the handling property, the workability and the cost.

The hard coated layer 5 is made of acrylic resin of ultraviolet-curable type, that is, of a type which can be cured when exposed to ultraviolet rays of light, such as the one sold under a trade identification of "GRANDIC.FC0605" manufactured by Dainippon Ink Kogyo K. K. of Japan, and has a thickness of about 5 micrometers.

The layered protective structure deposited on the faceplate 2 of the glass envelopes of the cathode ray tube according to the present invention is formed in the manner which will now be described with particular reference to FIGS. 2 and 3.

Figure 2:
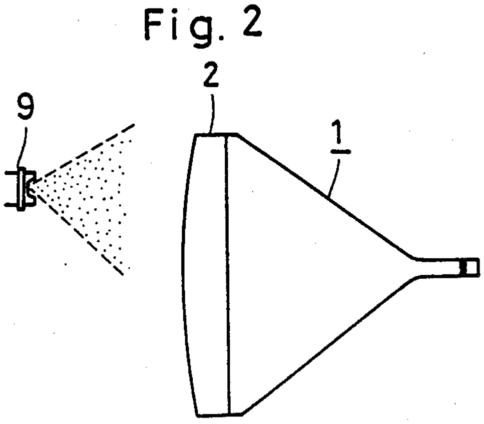
FIGS. 2 and 3 are schematic side views of the implosion protected cathode ray tube, showing different steps of a process of forming a layered structure on the faceplate.
Figure 3:
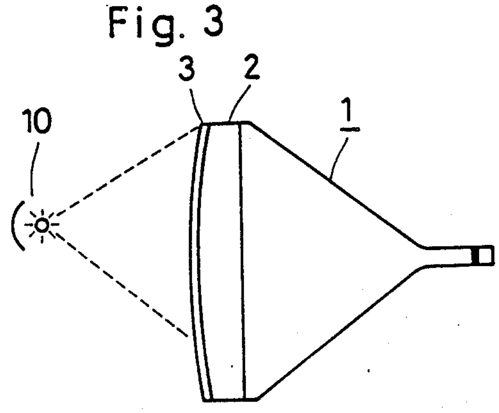

As shown in FIG. 2, a coating material for the first resin-coated layer 3 is first sprayed onto the faceplate 2 under a pressure of 3.5 kilogram per square centimeter with the use of a spraying technique 9, and is then dried by radiating ultraviolet rays of light for 30 seconds with the use of a high pressure mercury lamp 10 of 80 W/cm rated output to cure, i.e., harden, the first resin-coated layer 3, which lamp 10 is positioned at a location spaced about 15 cm from the faceplate 2. Subsequent to the curing of the first resin-coated layer 3, a coating material for the second resin-coated layer 4 is similarly sprayed under a pressure of 3.0 kilogram per square centimeter so as to cover the first resin-coated layer 3, followed by the radiation of ultraviolet rays of light for 30 seconds with the use of a similar mercury lamp of 80 W/cm rated output to complete the second resin-coated layer 4.

After the complete formation of the second resin-coated layer 4, a coating material for the hard coated layer 5 is sprayed under a pressure of 1.0 to 2.0 kilogram per square centimeter and is then exposed to ultraviolet rays of light to cure the hard coated layer 5, thereby completing the layered protective structure.

Thereafter, a steel reinforcement band is encompassed around the faceplate 2 in a well known manner to complete the implosion protected cathode ray tube.

While the preferred embodiment of the present invention has been described with the ultraviolet-curable coating matrial used for each of the first resin-coated layer 3, the second resin-coated layer 4 and the hard coated layer 5, a thermosetting resin may be employed in place of the ultraviolet-curable coating material.

The sum of the thicknesses of the respective first and second resin-coated layers 3 and 4 has been shown to be 130 micrometers, however, the sum of the thicknesses thereof may not be always limited to such value and may be within the range of 50 to 300 micrometers. Particularly, 70 to 150 micrometers in total thickness of the first and second resin-coated layers 3 and 4 is preferred in view of the transparency, the surface smoothness, the productivity and the implosion protective effect. Therefore, in the practice of the present invention, the first resin-coated layer 3 may have a thickness within the range of 20 to 200 micrometers and the second resin-coated layer 4 may have a thickness within the range of 20 to 70 micrometers.

With respect to the thickness of the hard coated layer 5 which has been shown to be about 5 micrometers in the foregoing embodiment, it may not be always limited to such value, but may be within the range of 5 to 30 micrometers, a particular value of which has to be chosen in consideration of the selected thickness of each of the first and second resin-coated layers 3 and 4. If the thickness of the hard coated layer 5 is smaller than the smallest limit of 5 micrometers, a satisfactory implosion protective effect cannot be obtained, but if it is greater than the greatest limit of 30 micrometers, the hard coated layer 5 will become susceptible to cracking.

The first resin-coated layer 3 has been described as having an elongation at breakage within the range of 65 to 85%. If the elongation of the first resin-coated layer 3 at breakage is smaller than 65%, the layered structure will not exhibit a satisfactory shock absorbing effect and will not bring about a satisfactory effect of minimizing the outward scattering of glass fragments in the event that the cathode ray tube is imploded. On the other hand, if the elongation of the first resin-coated layer at breakage is greater than 85%, the hard coated layer 5 overlaying the first resin-coated layer 3 with the intervention of the second resin-coated layer 4 will not give a satisfactory hardness and may be caused to be susceptible to cracking.

The hardness of the first resin-coated layer 3 is closely related with the elongation thereof at breakage. If the hardness of the first resin-coated layer 3 is greater than 1H hardness of the drawing pencil lead, the elongation of the first resin-coated layer 3 at breakage within the range of 65 to 85% will become difficult to attain.

On the other hand, the break strength of the first resin-coated layer 3 is preferred to be 3.5 kilograms per square millimeter or greater for the purpose of the satisfactory implosion protective effect.

The hard coated layer 5 is preferred to have a hardness equal to or higher than the 5H hardness of the drafting pencil lead for the purpose of minimizing the formation of scratches on the outer surface thereof and also the surface contamination.

As hereinbefore described, the elongation at breakage of the hard coated layer is preferred to be equal to or smaller than 3%. If it is greater than 3%, the hardness of the hard coated layer 5 which is equal to or higher than 5H hardness of the drafting pencil lead will become difficult to attain. It is, however, to be noted that the hard coated layer 5 is not provided for absorbing shocks which would be generated upon the implosion of the cathode ray tube, and therefore, the break strength of the hard coated layer 5 can be chosen of any suitable value provided that it can satisfy the required elongation at breakage.

The second resin-coated layer 4 interposed between the first resin-coated layer 3 and the hard coated layer 5 has been described as having an elongation at breakage which is generally intermediate between that of the first resin-coated layer 3 and that of the hard coated layer 5, and a hardness which is also generally intermediate between that of the first resin-coated layer 3 and that of the hard coated layer 5. Specifically, in order to minimize the possibility of cracking of the second resin-coated layer 4 and, also, to protect the hard coated layer 5 from cracking, the second resin-coated layer 4 is preferred to have an elongation at breakage within the range of 0.5 to 15%. The break strength of the second resin-coated layer 4 can be chosen of any suitable value because of a similar reason as discussed in connection with the hard coated layer 5 above.

From the foregoing full description of the preferred embodiment of the present invention, it has now become clear that, since any one of the first resin-coated layer, the second resin-coated layer and the hard coated layer can be formed by the use of any known spraying technique or a similar painting technique, and since inexpensive synthetic resin is employed as a coating material for any one of the first and second resin-coated layers and the hard coated layer, the present invention is effective to provide the improved implosion protected cathode ray tube that is light in weight, substantially free from distortion of the televised image, easy to manufacture and, yet, capable of exhibiting a maximized implosion protective effect.

Although the present invention has fully been described in connection with the preferred embodiment thereof with reference to the accompanying drawings used only for the purpose of illustration, those skilled in the art will readily conceive numerous changes and modifications within the framework of obviousness upon the reading of the specification herein presented of the present invention. Accordingly, such changes and modifications are, unless they depart from the spirit and scope of the present invention as delivered from the claims annexed hereto, to be construed as included therein.

We claim:

1. An implosion protected cathode ray tube which comprises a glass envelope having a faceplate; and a layered protective structure deposited over and positioned frontwardly of the faceplate, said layered protective structure including a first resin-coated layer held in contact with the faceplate, a hard coated layer for protecting the first resin-coated layer and a second resin-coated layer formed between the first resin-coated layer and the hard coated layer, said first resin-coated layer having a hardness which corresponds to 1H or lower of hardness of drafting pencil lead, and an elongation at breakage within the range of 65 to 85%, said first resin-coated layer also having a break strength of 3.5 kilograms per square millimeter or greater, said hard coated layer having a hardness which corresponds to 5H or higher of hardness of drafting pencil lead, and an elongation of 3% or smaller at breakage, and said second resin-coated layer having a hardness generally intermediate between the hardness of the first resin-coated layer and that of the hard coated layer and also an elongation at breakage generally intermediate between the elongation of the first resin-coated layer at breakage and that of the hard coated layer at breakage.

2. The cathode ray tube as claimed in claim 1, wherein the second resin-coated layer has an elongation at breakage within the range of 0.5 to 15%.

3. The cathode ray tube as claimed in claim 2, wherein the first resin-coated layer is made of polyurethane acrylate containing a relatively large quantity of urethane resin.

4. The cathode ray tube as claimed in claim 3, wherein the second resin-coated layer is made of polyurethane acrylate containing a relatively large quantity of acrylic resin.

5. The cathode ray tube as claimed in claim 4, wherein the first resin-coated layer has a thickness within the range of 20 to 200 micrometers and the second resin-coated layer has a thickness within the range of 20 to 70 micrometers.

6. The cathode ray tube as claimed in claim 5, wherein the hard coated layer is made of acrylic resin of ultraviolet-curable type.

7. The cathode ray tube as claimed in claim 1, wherein at least one of the first and second resin-coated layers is made of ultraviolet-curable resin.

8. The cathode ray tube as claimed in claim 1, wherein the first resin-coated layer is made of polyurethane acrylate containing a relatively large quantity of urethane resin.

9. The cathode ray tube as claimed in claim 1, wherein the second resin-coated layer is made of polyurethane acrylate containing a relatively large quantity of acrylic resin.

10. The cathode ray tube as claimed in claim 1, wherein the first resin-coated layer has a thickness within the range of 20 to 200 micrometers and the second resin-coated layer has a thickness within the range of 20 to 70 micrometers.

11. The cathode ray tube as claimed in claim 1, wherein the hard coated layer is made of acrylic resin of ultraviolet-curable type.

12. The cathode ray tube as claimed in claim 1, wherein at least one of the first and second resin-coated layers and the hard coated layer is made of thermosetting resin.

* * * * *